United States Patent [19]

Freese

[11] Patent Number: 4,766,879
[45] Date of Patent: Aug. 30, 1988

[54] FIREPLACE COOKING GRILL

[76] Inventor: Leo J. Freese, 118 N. Oak St., Lake City, Minn. 55041

[21] Appl. No.: 78,673

[22] Filed: Jul. 28, 1987

[51] Int. Cl.$^4$ .............................................. F24B 1/26
[52] U.S. Cl. ..................................... 126/137; 126/30; 126/25 A
[58] Field of Search .................. 126/25 R, 9 R, 25 A, 126/29, 30, 137, 153, 9 B; 248/125, 124, 298

[56] References Cited

U.S. PATENT DOCUMENTS

| | | | |
|---|---|---|---|
| 1,384,250 | 7/1921 | Froom | 126/30 |
| 2,523,200 | 9/1950 | Durst, Jr. | 126/30 |
| 2,719,691 | 10/1955 | Vance | 248/298 |
| 2,914,283 | 11/1959 | Jorgensen | 248/125 |
| 2,960,979 | 11/1960 | Stone | 126/137 |
| 2,998,001 | 7/1961 | Lofgren et al. | 126/137 |
| 3,111,123 | 11/1963 | LeFort | 126/137 |
| 3,139,882 | 7/1964 | White | 126/137 |
| 3,834,370 | 9/1974 | Nelson | 126/137 |
| 4,553,525 | 11/1985 | Ruble | 126/30 |

FOREIGN PATENT DOCUMENTS 3898 of 1912 United Kingdom ................. 126/30

Primary Examiner—James C. Yeung
Attorney, Agent, or Firm—Fleit, Jacobson, Cohn & Price

[57] ABSTRACT

A fireplace cooking grill supported for vertical and horizontal adjustment in a fireplace opening with the grill being supported from a vertically disposed support post having a rack gear along one edge thereof with the grill including a slide on the post having a manually rotatable gear mounted in a gear housing in engagement with the rack gear for vertically adjusting the grill. The rotatable gear is provided with a detachable handle, which can be removed when desired, and the gear housing includes a bracket having a horizontally disposed support member slidably supporting a grill frame and a removable grill therein which enables the grill to be vertically adjustable in relation to the fireplace and horizontally adjustable inwardly and outwardly of the fireplace to enable optimum positioning of the grill in relationship to a fire, coals, or other heat source in the fireplace.

8 Claims, 1 Drawing Sheet

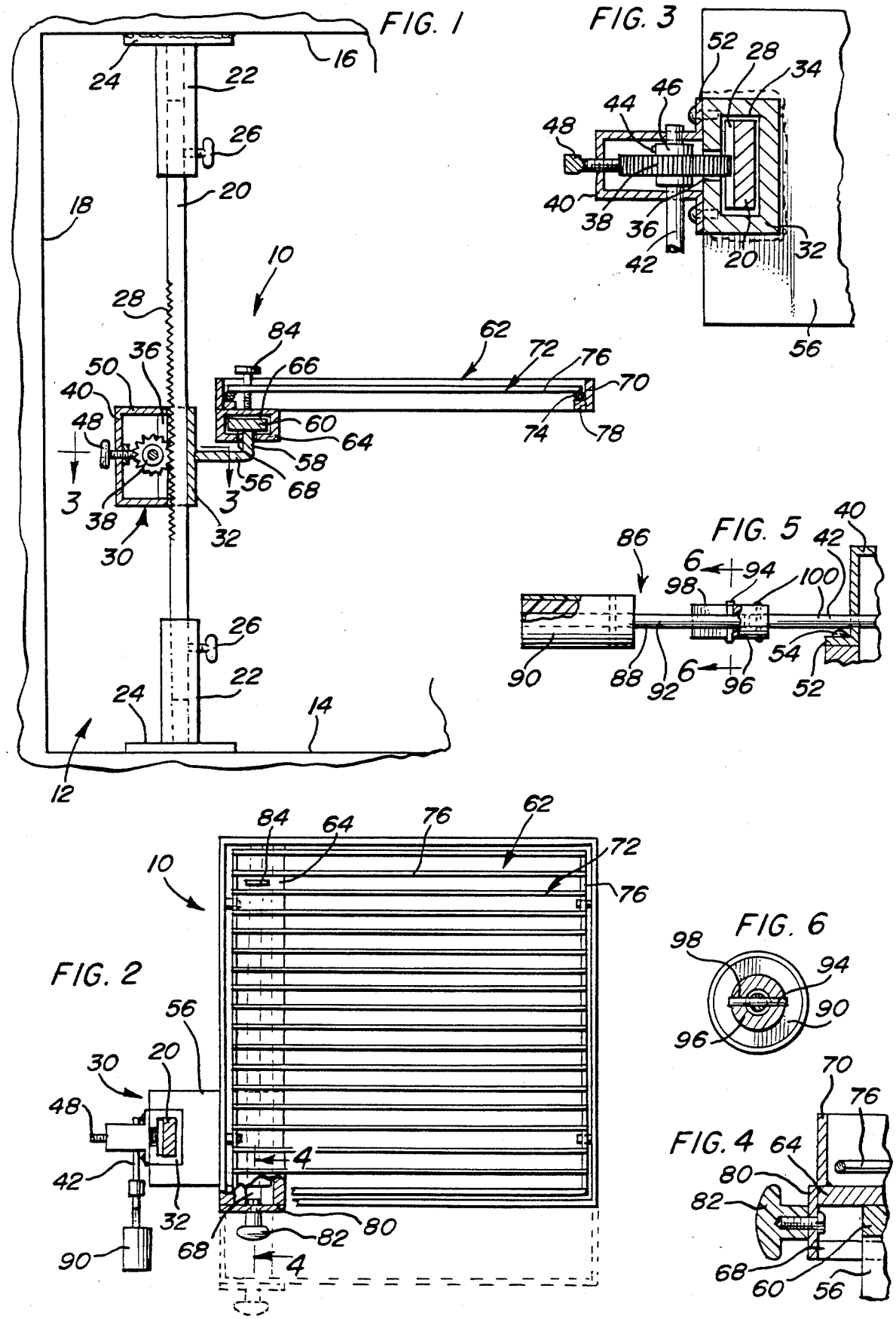

FIREPLACE COOKING GRILL

BACKGROUND OF THE INVENTION

Field of Invention

The present invention generally relates to a fireplace cooking grill and more specifically to a grill supported for vertical and horizontal adjustment in a fireplace opening with the grill being supported from a vertically disposed support post having a rack gear along one edge thereof with the grill including a slide on the post having a manually rotatable gear mounted in a gear housing in engagement with the rack gear for vertically adjusting the grill. The rotatable gear is provided with a detachable handle, which can be removed when desired, and the gear housing includes a bracket having a horizontally disposed support member slidably supporting a grill frame and a removable grill therein which enables the grill to be vertically adjustable in relation to the fireplace and horizontally adjustable inwardly and outwardly of the fireplace to enable optimum positioning of the grill in relationship to a fire, coals, or other heat source in the fireplace.

INFORMATION DISCLOSURE STATEMENT

Various types of grills have been provided to support food items in relation to a heat source including grills that are supported in fireplaces with some adjustments being provided to enable movement of the food items to be cooked to move in relation to the fireplace and the heat source therein. Previously known devices do not include the specific structural arrangements incorporated into this invention. A separate information disclosure statement will be filed.

SUMMARY OF THE INVENTION

An object of the present invention is to provide a fireplace cooking grill which can be easily and quickly installed in a fireplace and includes a structure enabling vertical movement of a grill which receives food items to be cooked as well as horizontal movement of the grill for positioning the food items in optimum relation to a source of heat in the fireplace which may involve any conventional wood fire or coals, charcoal, or the like.

Another object of the invention is to provide a fireplace cooking grill in accordance with the preceding object in which the vertical adjustment is obtained by the use of a vertical support post extending between upper and lower sockets mounted on the top and floor or hearth of the fireplace with the support post including a rack gear extending longitudinally thereof, and the grill including a slide mounted on the post having a gear housing with a gear therein meshed with the rack gear with a handle attached to the gear for rotating the same and vertically adjusting the grill on the post.

A further object of the invention is to provide a fireplace cooking grill in accordance with the preceding objects in which the handle is removable from the gear and provided with an insulating hand grip to enable adjustment of the grill with the handle being removable for storage to remove a projecting component and eliminate the possibility of unauthorized vertical adjustment of the grill.

Still another object of the invention is to provide a fireplace cooking grill in accordance with the preceding objects in which the slide includes a laterally extending bracket having a horizontal support member, slidably received in a channel-like structure on a grill frame to enable the grill frame and a removable grill positioned in the frame to be moved horizontally inwardly and outwardly of the fireplace thereby orienting the grill and food items thereon in optimum position.

Yet another object of the invention is to provide a fireplace cooking grill which is rugged in construction, simple to use, effective for obtaining optimum cooking conditions for food items placed thereon and relatively inexpensive to manufacture.

These together with other objects and advantages which become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of the grill with portions shown in section illustrating the structural details thereof.

FIG. 2 is a top plan view of the grill.

FIG. 3 is a transverse, sectional view taken substantially upon a plane passing along section line 3—3 on FIG. 1 illustrating the structural details of the post, slide and gear housing.

FIG. 4 is a sectional view taken along section line 4—4 on FIG. 2 illustrating the structure of a grill frame and limit screw for limiting the horizontal movement of the grill.

FIG. 5 is a sectional view of the handle and the detachable connection to the gear shaft.

FIG. 6 is a sectional view taken along section line 6—6 on FIG. 5 illustrating the detachable driving connection between the handle and gear shaft.

DESCRIPTION OF A PREFERRED EMBODIMENT

Referring now specifically to the drawings, the fireplace cooking grill of the present invention is generally designated by numeral 10 and is installed in a fireplace opening 12 by engagement with the hearth or floor 14 of the fireplace and the downwardly facing top surface 16 of the fireplace in spaced relation to one side wall 18 as illustrated in FIG. 1. The grill 10 includes an elongated, vertically disposed support post 20, which has the ends thereof telescoped into tubular sockets 22, each of which includes a plate 24 on the outer end thereof and a thumb screw 26 adjacent the inner end thereof, so that the support post 20 can be secured in place between the floor 14 and top 16 of the fireplace 12 with the thumb screw 26 and tubular socket 22 enabling a fixed length support post 20 to be supported in fireplaces having different vertical heights with it also being pointed out that the length of the post 20 may be varied depending upon the installational requirements of the fireplace. As illustrated, the post 20 has a rectangler cross-sectional configuration and includes a rack-gear 28 formed by a plurality of spaced notches and projections extending laterally of the wider surface of the post 20 with the rack gear 28 extending from edge-to-edge of the post 20 as illustrated in FIG. 3 and facing the adjacent vertical wall 18 of the fireplace 12 as illustrated in FIG. 1.

Vertically slidably mounted on the support post 20 is a slide 30 which includes a tubular sleeve 32 having an internal hollow area 34 corresponding in shape to the external shape of the post 20 as illustrated in FIG. 3.

The wall of the tubular sleeve 32 facing the rack gear 28 is provided with an opening 36 through which the periphery of a pinion gear 38 projects with the pinion gear being in meshing engagement with the rack gear 28. The pinion gear 38 is supported in a generally channeled-shaped gear housing 40 on a gear shaft 42 which may be in the form of a hollow pipe. The gear shaft 42 extends through the opposed side walls of the gear housing 40 with the pinion gear 38 being secured thereto by set screws 44 extending through collars 46. The wall of the gear housing 40 in opposed relation to the opening 36 is provided with a thumb screw 48 threaded therethrough with the inner end engageable with the gear 38 to lock the gear 38 in position. This thumb screw may be provided with a spring to frictionally retain it in adjusted position if desired.

As illustrated in FIG. 1, the gear housing 40 is provided with a closure plate 50 on the upper and lower ends thereof to prevent entry of undesirable materials into the gear housing and to rigidify the structure with the sidewalls of the gear housing including outurned flanges 52 secured to the tubular sleeve 32 by suitable fastening devices 54 to enable assembly and disassembly of the components.

The slide 30 includes a laterally extending bracket 56 rigidly affixed thereto as by welding with the bracket being welded to the tubular sleeve 32 and including an upturned outer end 58 terminating in a horizontally disposed slide bar 60 which is of rectangler cross-sectional configuration and extends horizontally in perpendicular relation to the support post 20 and also parallel to the sidewall and top and bottom of the fireplace 12. The slide bar 60 slidably supports a grill assembly generally designated by the numeral 62 which includes a horizontally elongated tubular slide member 64 having an internal hollow cross-sectional configuration 66 corresponding to the shape of the slide bar 60 and closely receiving the slide bar 60 with the bottom wall of the tubular slide member 64 including a slot 68 receiving the upturned end 58 of the bracket 56 so that the tubular slide member 64 can slide inwardly and outwardly of the fireplace 12. Rigidly affixed to the upper surface of the slide member 64 is a peripheral frame 70 which removeably receives a grill 72 in the form of a wire rod grill having a peripheral bottom wire rod 74 and a plurality of spaced wire rods 76 mounted rigidly thereon. The frame 70 is in the form of a structural bar of rectangler configuration with the larger dimension thereof extending vertically with the lower inner edge of the frame 70 including an inwardly extending bar or lip 78 which forms a ledge for supporting the grill 72 with the lip 78 being engaged by the wire frame member 74 for the grill 72 with the upper edges of the frame 70 retaining the grill 72 in place, but yet letting the grill be easily removed for cleaning or for other purposes.

In order to move the frame 70 and grill 72 inwardly and outwardly, the outer end of the tubular slide member 64 is provided with a closure plate 80 having a knob or handle 82 thereon constructed of insulating material so that the knob or handle 82 can be manually moved inwardly and outwardly by exerting inward and outward force thereon, thus causing the slide member 64 to slide on the slide bar 60. The other end of the slide member 64 is provided with a vertically extending thumb screw 84, extending downwardly through the top wall of the slide member to form a stop for limiting the outward movement of the frame 70 and grill 72 thereon with the thumb screw also having an insulating handle so that removal of the screw will enable complete removal of the frame 70 and grill 72 when desired.

The gear 38 can be manually rotated by use of a handle 86 which includes a shaft 88 which may be of tubular material having a hand grip 90 mounted at one end thereof and an offset portion 92 incorporated therein to form a crank structure with the other end of the shaft 88 including a rigid transverse pin 94 that is slidably and detachably received in a slotted tubular member 96 having diametrically opposed and longitudinally extending slots 98 communicating with one end thereof with the other end of the tubular member 96 being fixedly attached to the gear shaft 42 by a fastening rivet or the like 100 to provide a detachable driving connection between the handle 86 and the gear shaft 42. The offset portion 92 in the shaft 88 enables the hand grip to be moved in a circular path for raising or lowering the slide 30 and the grill assembly 62 when the thumb screw 48 is released. After a desired vertical adjustment has been obtained, the thumb screw 48 can be manipulated to lock the gear 38 in place and the handle 86 removed by sliding the shaft and pin 94 outwardly from the tubular connector or pipe 96. Horizontal adjustment of the grill 72 is obtained by grasping the knob 82 and moving the frame 70 and slide member 64 on the slide bar 60 with the thumb screw 84 limiting movement in one direction and the closure plate 80 limiting movement in the other direction. The location of the slide bar 60 at one edge of the frame 70 assures that the frictional engagement between the slide member 64 and slide bar 60 which is substantially shorter than the length of the slide member 64 will retain the slide member 64 in adjusted position between the limits of movement since the outer end portion of the grill 72 and frame 70 forms a cantilever force trying to rotate the slide member 64 downwardly on the slide bar 60 so that frictional forces will retain the grill assembly 62 adjusted on the slide bar 60.

The grill assembly 62 can be completely removed so that only the support post and slide 30 are left in the fireplace with the grill and frame being usually cleaned when removed and stored wherever desired along with the removable handle. The hand grip connected with the handle and the knob and thumb screws may be constructed of insulating materials such as "Bakelite" to enable these components to be manipulated without danger of injury to the hands. Also, removal of the handle eliminates the possibility of children changing the elevational position of the grill thereby maintaining optimum cooking conditions of the items on the grill at all times.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fireplace cooking grill comprising a vertically disposed supporting post, means securing said post to a fireplace, a slide, means vertically adjustably supporting said slide on the post, a grill assembly, means supporting the grill assembly from the slide for horizontal adjustment of the grill assembly, said means vertically adjustably supporting said slide on the post including a rack gear on said post and said slide including a pinion gear in mesh with the rack gear, handle means connected with said pinion gear for rotating the pinion gear for varying the elevational position of the slide on the post, said means supporting the grill assembly from the slide for horizontal adjustment of the grill assembly including a horizontally disposed slide bar rigidly affixed to the slide, said grill assembly including a horizontally disposed slide member slidable on the slide bar, said slide bar and slide member being perpendicular to the post for horizontal sliding movement in relation to the fireplace, and wherein said grill assembly further includes a periphery frame having the slide member along one edge thereof, said slide member and said bar being of corresponding polygonal configuration so that the grill assembly and any food items thereon will be cantilever supported from the slide bar for frictionally securing the slide member and grill assembly in adjusted position.

2. The structure as defined in claim 1 wherein said handle includes an offset crank portion and a detachable connection with the pinion gear, said pinion gear being supported in a gear housing attached to the slide and lock means engaging the periphery of the pinion gear to lock it in adjusted position.

3. The structure as defined in claim 1 wherein said slide member includes an insulating knob at one end thereof for manual movement of the slide member on the slide bar and a limit stop screw at the other end of the slide member to limit movement of the slide member in relation to the slide bar.

4. The structure as defined in claim 3 wherein said grill assembly includes a removable grill mounted on the frame to enable the grill to be removed for cleaning purposes, said stop screw on the slide member being removable to enable the grill assembly to be detached from the slide so that only the post and slide can be left mounted in the fireplace during periods of nonuse of the grill assembly.

5. A cooking grill comprising a vertical support member, a slide mounted on said support member for vertical adjustment, means retaining said slide in vertically adjusted position on said support member, a grill and means mounting said grill on said slide for horizontal movement including a slide member and slide bar, one of said slide member and slide bar being rigid with the slide and the other of said slide member and slide bar being rigid with said grill, said slide member and slide bar being horizontally disposed and having surfaces to enable relative horizontal movement and to prevent relative vertical movement, wherein said slide member and slide bar are polygonal in cross-section with the slide member being tubular and rigid with an edge portion of the grill and provided with a longitudinal slot in a lower wall portion, said slide bar being rigid with the slide and received in said tubular slide member, a bracket interconnecting the slide and slide bar, said bracket extending through the slot in the slide member.

6. The cooking grill as defined in claim 5 wherein said grill includes a frame, and a grill member removably mounted on said frame to enable removal to facilitate cleaning.

7. The cooking grill as defined in claim 5 wherein said slide bar has a length substantially shorter than the slide member and has an outer periphery closely received and engaged by the interior of the tubular slide member to enable sliding movement of the slide member on the slide bar without the slide bar exiting from the ends of the slide member, and means adjacent each end of the slide member to retain the slide bar in the slide member, said slide bar retaining means adjacent one end of said slide member being removable to enable separation of the grill from the slide.

8. The cooking grill as defined in claim 7 wherein said support member includes a rack gear along the length thereof, said slide including a driveable pinion gear in meshing engagement with the rack gear to vertically adjust the slide.

* * * * *